US009632282B2

(12) United States Patent
Van Lue et al.

(10) Patent No.: US 9,632,282 B2
(45) Date of Patent: Apr. 25, 2017

(54) SECONDARY MIRROR POSITIONING MECHANISM

(71) Applicant: Raytheon Corporation, Waltham, MA (US)

(72) Inventors: David Van Lue, El Segundo, CA (US); Andrew L. Bullard, El Segundo, CA (US); Hans P. Naepflin, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 233 days.

(21) Appl. No.: 14/549,163

(22) Filed: Nov. 20, 2014

(65) Prior Publication Data
US 2016/0147039 A1 May 26, 2016

(51) Int. Cl.
| | |
|---|---|
| F16H 27/02 | (2006.01) |
| G02B 7/182 | (2006.01) |
| F16H 25/20 | (2006.01) |
| G01D 5/14 | (2006.01) |
| B23Q 1/26 | (2006.01) |
| G02B 7/183 | (2006.01) |

(52) U.S. Cl.
CPC .............. *G02B 7/182* (2013.01); *B23Q 1/26* (2013.01); *F16H 25/20* (2013.01); *G01D 5/14* (2013.01); *G02B 7/183* (2013.01); *G02B 7/1827* (2013.01); *F16H 2025/2043* (2013.01)

(58) Field of Classification Search
CPC ...... G02B 7/182; G02B 7/1827; G02B 7/183; B23Q 1/16; F16H 25/20; G01D 5/14
See application file for complete search history.

(56) References Cited

U.S. PATENT DOCUMENTS

| | | | | |
|---|---|---|---|---|
| 2,966,049 | A | * 12/1960 | Ormond | .................. F16C 11/12 |
| | | | | 267/160 |
| 4,060,315 | A | 11/1977 | Heinz | |
| 4,629,297 | A | 12/1986 | Horine | |
| 4,726,671 | A | 2/1988 | Ahmad et al. | |
| 5,079,641 | A | 1/1992 | Marino | |
| 5,461,515 | A | * 10/1995 | Sorce | ..................... F16M 11/12 |
| | | | | 248/481 |
| 5,801,891 | A | 9/1998 | Lloyd | |
| 8,390,233 | B2 | 3/2013 | Shilpiekandula et al. | |

(Continued)

FOREIGN PATENT DOCUMENTS

| | | |
|---|---|---|
| DE | 3814829 A1 | 12/1988 |
| DE | 4445642 A1 | 6/1996 |

OTHER PUBLICATIONS

Ohl, R.G. et al. Performance of the Far Ultraviolet Spectroscopic Explorer mirror assemblies. Proc. SPIE, vol. 4139: Instrumentation for UV/EUV Astronomy and Solar Missions, 137 (Dec. 18, 2000).

(Continued)

*Primary Examiner* — William Kelleher
*Assistant Examiner* — Zakaria Elahmadi
(74) *Attorney, Agent, or Firm* — Burns & Levinson LLP; Joseph M. Maraia

(57) ABSTRACT

Systems that provide an active adjustment of mirrors and specifically of secondary mirrors, and that provide active adjustment of secondary mirrors in six degrees of freedom, and that can carry the additional load during launch.

22 Claims, 4 Drawing Sheets

(56) References Cited

U.S. PATENT DOCUMENTS

| | | | | |
|---|---|---|---|---|
| 2008/0093886 A1* | 4/2008 | Nusbaum | ............. | B62D 35/001 |
| | | | | 296/180.1 |
| 2009/0261203 A1* | 10/2009 | Gouette | ................. | B64C 25/58 |
| | | | | 244/137.1 |
| 2010/0122602 A1* | 5/2010 | Marcroft | ............. | B25J 17/0216 |
| | | | | 74/490.03 |
| 2010/0234844 A1* | 9/2010 | Edelhauser | ............ | A61B 17/62 |
| | | | | 606/56 |
| 2011/0308296 A1* | 12/2011 | Sasso | ..................... | G01C 19/72 |
| | | | | 73/1.77 |
| 2013/0041288 A1* | 2/2013 | Taylor | .................. | A61B 5/6878 |
| | | | | 600/587 |
| 2013/0093871 A1* | 4/2013 | Nowatzyk | ............. | G02B 21/14 |
| | | | | 348/79 |
| 2014/0263766 A1* | 9/2014 | Venton-Walters | ..... | A01G 25/09 |
| | | | | 239/726 |
| 2015/0077874 A1* | 3/2015 | Naepflin | ............. | G02B 7/1822 |
| | | | | 359/872 |

OTHER PUBLICATIONS

Hill, G.J. et al. The Hobby-Eberly Telescope Low Resolution Spectrograph: mechanical design. Proc. SPIE, vol. 3355: Optical Astronomical Instrumentation, 433 (Jul. 9, 1998).

Hale, L.C. High-NA Camera for an EUVL Microstepper. 15th Annual American Society for Precision Engineering, Scottsdale, Arizona, Oct. 22-27, 2000.

Koski, K. Focus Mechanism for Kepler Mission. Retrieved from www.esmats.eu/amspapers/pastpapers/pdfs/2008/koski.pdf (2008).

Koski, K. Focus Mechanism for Kepler Mission. Proceedings of the 39th Aerospace Mechanisms Symposium, NASA Marshall Space Flight Center, May 2008, pp. 359-372.

\* cited by examiner

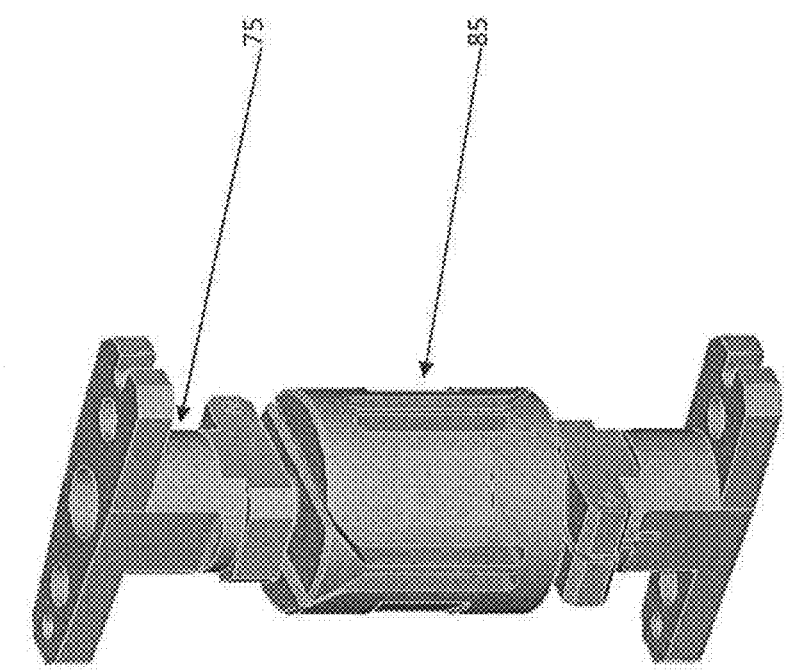

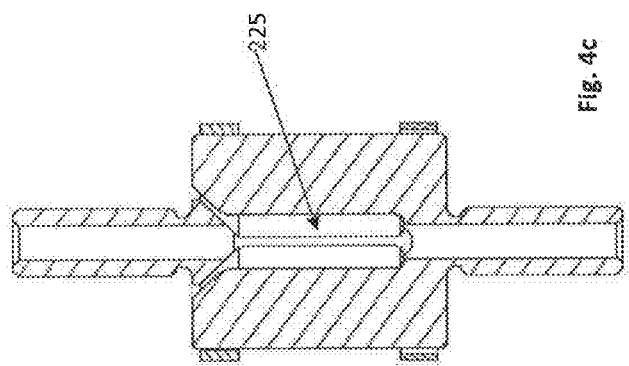
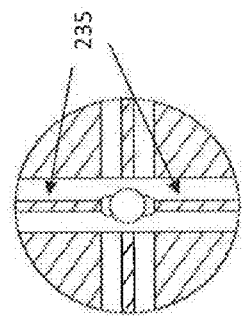
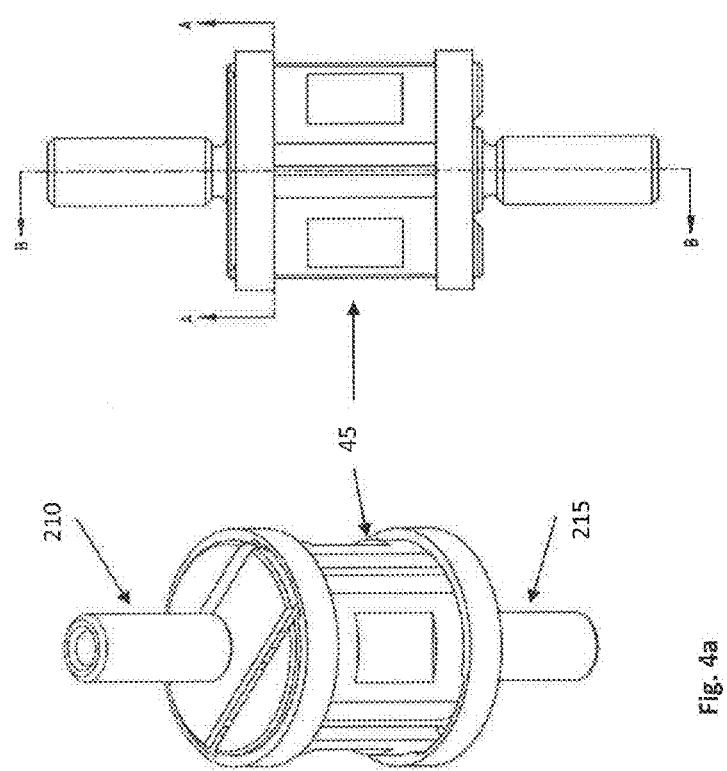

SECONDARY MIRROR POSITIONING MECHANISM

BACKGROUND

This invention relates generally to telescopes, and, more particularly, to a system for adjusting a secondary mirror of a telescope.

In some instances, it is desirable to position a telescope in orbit around the earth to obtain clear images of remote targets such as astronomical phenomena. As used herein, the term "telescope" refers to any device that collects, magnifies, or concentrates light and/or electromagnetic radiation received from and/or transmitted to a distant point. When a telescope is positioned in orbit, the light originating from such remote targets can be collected without the distortion that occurs when that light passes through the earth's atmosphere. Accordingly, several telescopes have been placed in orbit around the earth. In many instances, such space telescopes have been mounted on platforms (satellites).

In one exemplary instance, in a Newtonian type of telescope, the secondary mirror is typically attached to a mount having a plurality of legs and a central housing. The secondary mirror is mounted on a platform upon the central housing that may be adjusted to move the secondary mirror. The adjustment may be manually accomplished if the housing is accessible. Manual adjustment may be very time consuming because of repeated adjustments necessary in a trial and error method. Further, if the system is closed, it must be opened and reclosed. Another problem may be the danger to the optical system from dropped objects, finger prints, etc. If the telescope system is placed in space, normally manual adjustment must occur before launch. The secondary mirror may be placed out of adjustment by vibration, changes in temperature, etc. Even the most ruggedly built system will require minor adjustments in this case.

Active adjustment systems have been in use focusing mechanisms for primary mirrors in photometers mounted onto a spacecraft. In those active adjustment systems, motion (of struts) is constrained to one dimension. This conventional design has constraints that are not necessary in the active adjustment system for secondary mirror.

There is a need for systems that provide an active adjustment of mirrors and specifically of secondary mirrors. There is also a need for systems that provide active adjustment of secondary mirrors in six degrees of freedom. There is also a further need to provide a system with components that can sustain the load during launch without additional constraint devices.

BRIEF SUMMARY

Systems that provide an active adjustment of mirrors and specifically of secondary mirrors, that provide active adjustment of secondary mirrors in six degrees of freedom, and that can sustain the load during launch are disclosed herein below In one or more embodiments, the apparatus of these teachings for adjusting motion of a strut, where the strut is a component in a positioning mechanism, includes a linear motion actuator located substantially parallel to the strut, the strut not being constrained to one dimensional motion, a lever arm component operatively attached at one end to a moving portion of the linear motion actuator and operationally attached to a strut mounting component at a location between the one end and another end, and a flexure operatively attached to the lever arm component at an edge of the lever arm component closest to the strut; the flexure being parallel to the strut and extending from the edge of the lever arm component closest to the strut to a base component, the base component being located away from another edge of the lever arm component, being operatively attached to a nonmoving portion of the linear motion actuator and extending from the nonmoving portion of the linear motion actuator to at least a location at which the flexure is attached. A pivot point of the lever arm component is located at a position along the flexure. The flexure is located in a main load path of the strut.

In one or more embodiments, the apparatus of these teachings for remotely positioning a component includes a number of struts configured to hold a mount for the component; each strut being operatively attached to a strut mounting component at a strut end opposite another strut end operatively connected to the mount for the component, each strut mounting component being operatively attached to a motion adjustment apparatus, and a rigid component, a base component of each motion adjustment apparatus being operatively attached to the rigid component. In one instance, the motion adjustment apparatus is as described herein above. In that instance, the motion adjustment apparatus includes a linear motion actuator located substantially parallel to the strut; the strut not being constrained to one dimensional motion, a lever arm component operatively attached at one end to a moving portion of the linear motion actuator and operatively attached to a strut mounting component at a location between the one end and another end, and a flexure operatively attached to the lever arm component at an edge of the lever arm component closest to the strut; the flexure being parallel to the strut and extending from the edge of the lever arm component closest to the strut to the base component, the base component being located away from another edge of the lever arm component, being operatively attached to a nonmoving portion of the linear motion actuator and extending from the nonmoving portion of the linear motion actuator to at least a location at which the flexure is attached. A pivot point of the lever arm component is located at a position along the flexure. In one instance, the pivot point of the lever and component is located midway along the flexure. The flexure is located in a main load path of the strut. In one embodiment, the component being positioned is a secondary mirror.

A number of other embodiments are disclosed herein below.

For a better understanding of the present teachings, together with other and further objects thereof, reference is made to the accompanying drawings and detailed description and its scope will be pointed out in the appended claims.

BRIEF DESCRIPTION OF THE DRAWINGS

FIG. 2 is a graphical schematic representation of one embodiment of the strut mount component used in embodiments of the motion adjusting apparatus of these teachings;

FIG. 3a is a graphical schematic representation of one embodiment of the apparatus of these teachings for remotely positioning a component;

FIG. 3b represents a view of the motion adjustment apparatus for each of two struts in the embodiment of the apparatus of these teachings for remotely positioning a component shown in FIG. 3a;

FIGS. 4a, 4b provide two views of the U joint flexure of these teachings, a subcomponent of the embodiment shown in FIG. 2; and FIGS. 4c and 4d will provide the two cross sectional views indicated in FIG. 4b.

DETAILED DESCRIPTION

The following detailed description presents the currently contemplated modes of carrying out the invention. The description is not to be taken in a limiting sense, but is made merely for the purpose of illustrating the general principles of the invention.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

The term "U joint flexure," as used herein, refers to a universal joint flexure.

Systems that provide an active adjustment of mirrors and specifically of secondary mirrors, that provide active adjustment of secondary mirrors in six degrees of freedom, and that can carry the additional load during launch are disclosed herein below In one or more embodiments, the apparatus of these teachings for adjusting motion of a strut, where the strut is a component in a positioning mechanism, includes a linear motion actuator located substantially parallel to the strut, the strut not being constrained to one dimensional motion, a lever arm component operatively attached at one end to a moving portion of the linear motion actuator and operatively attached to a strut mounting component at a location between the one end and another end, and a flexure operatively attached to the lever arm component at an edge of the lever arm component closest to the strut; the flexure (also referred to as the primary flexure) being parallel to the strut and extending from the edge of the lever arm component closest to the strut to a base component, the base component being located away from another edge of the lever arm component, being operatively attached to a nonmoving portion of the linear motion actuator and extending from the nonmoving portion of the linear motion actuator to at least a location at which the flexure is attached. A pivot point of the lever arm component is located at a position along the flexure. The flexure is located in a main load path of the strut. In one instance, the pivot point is located at a midpoint of the flexure.

Figure 1:
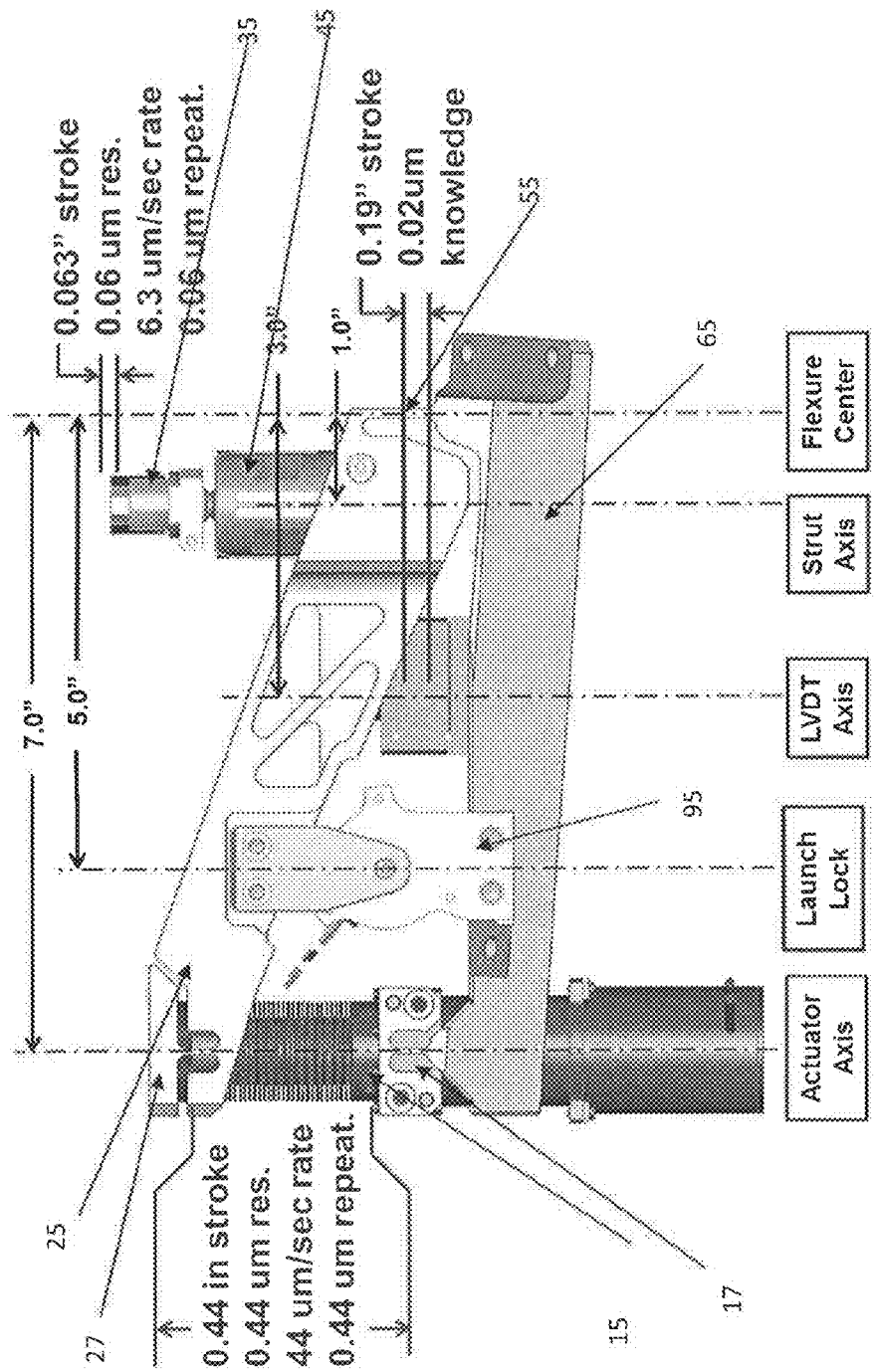
FIG. 1 is a graphical schematic representation of one embodiment of the motion adjusting apparatus of these teachings.

In one embodiment, the strut mounting component has a strut mount operatively connected to a universal (U) joint flexure and the U joint flexure is a 2-Axis flexure. The strut mounting component enables the strut load to act directly on the primary flexure. One embodiment of the apparatus of these teachings for adjusting motion of a strut is shown in FIG. 1. Referring to FIG. 1, in the embodiment shown there in, an actuator 15 is substantially parallel to a strut 35 (see also FIGS. 3a, 3b). In contrast to conventional motion adjusting apparatus, the strut is not constrained to one dimensional motion although motion is induced in the direction defined by the strut, a primary flexure 55 and the actuator 15 being substantially parallel to the strut 15. A lever arm 25 is operatively attached to a moving portion of the actuator 15 at one end and operatively attached to a strut mounting component 45 at a location between the one end and another end. A flexure 55 is operatively attached to the lever arm 25 at an edge of the lever arm closest to the strut. The flexure 55 is parallel to the strut 35 and extends from the edge of the lever arm closest to the strut 35 to a base component 65. The flexure 55 is located in a main load path of the strut 35. A pivot point of the lever arm 25 is located along the flexure 55. In the embodiment shown in FIG. 1, the pivot point of the lever arm 25 is located at a mid point of the flexure 55. The base component 65 is located away from the other edge of the lever arm 25 and is operatively attached to a nonmoving portion of the actuator 15. The base component 65 extends from the nonmoving portion of the actuator 15 to at least a location at which the flexure 55 (also referred to as the primary flexure 55) is attached. Two actuator support flexures 17, 27 are used in attaching the lever arm 25 and the base component 55 to the actuator 15. The actuator support flexures 17, 27 are substantially parallel to the strut 35 and decouple bending loads from the actuator 15 as the lever arm 25 moves in an arced path about the pivot point.

In some embodiments, the apparatus of these teachings for adjusting motion of a strut is used in positioning a component of a system that is placed in orbit. In those embodiments, the apparatus can include an optional launch lock 95. For a variety of practical designs, based on the primary flexure 55 being configured to be the principal strut load path during launch, the optional launch lock 95 is not required.

FIG. 2 shows a detailed view of one embodiment of the strut mounting component 45. Referring to FIG. 2, in the embodiment shown therein, the strut mounting component 45 includes a strut mount 75 and a universal (U) joint flexure 85. In one instance, the U joint flexure includes a 2-Axis flexure. The strut mounting component 45 enables the strut load to act directly on the primary flexure. The 2-axis flexure eliminates the need for horizontal flexures used in conventional designs. One embodiment of the strut mounting component 45 and the U joint flexure of these teachings is shown in FIGS. 4a-4d. FIGS. 4a, 4b provide two views of the embodiment of the U joint flexure of these teachings. FIG. 4c provides a cross-sectional view of the B-B cross section indicated in FIG. 4b. FIG. 4d provides a cross-sectional view of the A-A cross section indicated in FIG. 4b. (A description of another embodiment of a U joint flexure is given in U.S. Pat. No. 2,966,049, which is incorporated by reference herein in its entirety and for all purposes.)

Referring to FIG. 4a, in the embodiment shown therein, the strut mounting component 45 includes threaded components 210, 215 that allow for ground-based strut adjustment. One threaded component 210 is disposed on one end of the strut mounting component and another threaded component 215 is disposed at an opposite end of the strut mounting component. The two threaded components 210, 215 are configured for ground-based positioning the strut (and a component supported by the strut). The ground-based strut adjustment enables ground-based setup and testing of a component supported by the strut (such as a secondary mirror). FIG. 4c shows one flexure 225 along one axis and FIG. 4d shows another flexure 235 along another axis.

In one instance, the flexure, the lever arm component and the base component are fabricated from a same material, thereby minimizing thermal expansion mismatch. In one embodiment, the material is titanium or a titanium alloy. In another embodiment, the strut mounting component and U joint flexure are fabricated from Invar in order to match the thermal expansion of a material used for the strut.

In another instance, the apparatus also includes a position sensor configured to sense displacement of the strut. In one embodiment, the position sensor includes a comprises a Linear Variable Differential Transformer (LVDT). In one instance, the LVDT is parallel to the strut. The position sensor is attached to the fixed mount (65, FIG. 1) and also attached to a moving portion of the mechanism that is parallel to the strut.

In one or more embodiments, the apparatus of these teachings for remotely positioning a component includes a number of struts configured to hold a mount for the component, each strut being operatively attached to a strut mounting component at a strut end opposite another strut end operatively connected to the mount for the component, each strut mounting component being operatively attached to a motion adjustment apparatus, and a rigid component, a base component of each motion adjustment apparatus being operatively attached to the rigid component. In one instance, the motion adjustment apparatus is as described herein above. In that instance, the motion adjustment apparatus includes a linear motion actuator located substantially parallel to the strut; the strut not being constrained to one dimensional motion, a lever arm component operatively attached at one end to a moving portion of the linear motion actuator and operatively attached to a strut mounting component at a location between the one end and another end, and a flexure operatively attached to the lever arm component at an edge of the lever arm component closest to the strut; the flexure (Also referred to as a flexure blade) being parallel to the strut and extending from the edge of the lever arm component closest to the strut to the base component, the base component being located away from another edge of the lever arm component, being operatively attached to a nonmoving portion of the linear motion actuator and extending from the nonmoving portion of the linear motion actuator to at least a location at which the flexure is attached. A pivot point of the lever arm component is located at a position along the flexure. The flexure is located in a main load path of the strut.

In one embodiment, the component being positioned is a secondary mirror.

Figures 3A, 3B:
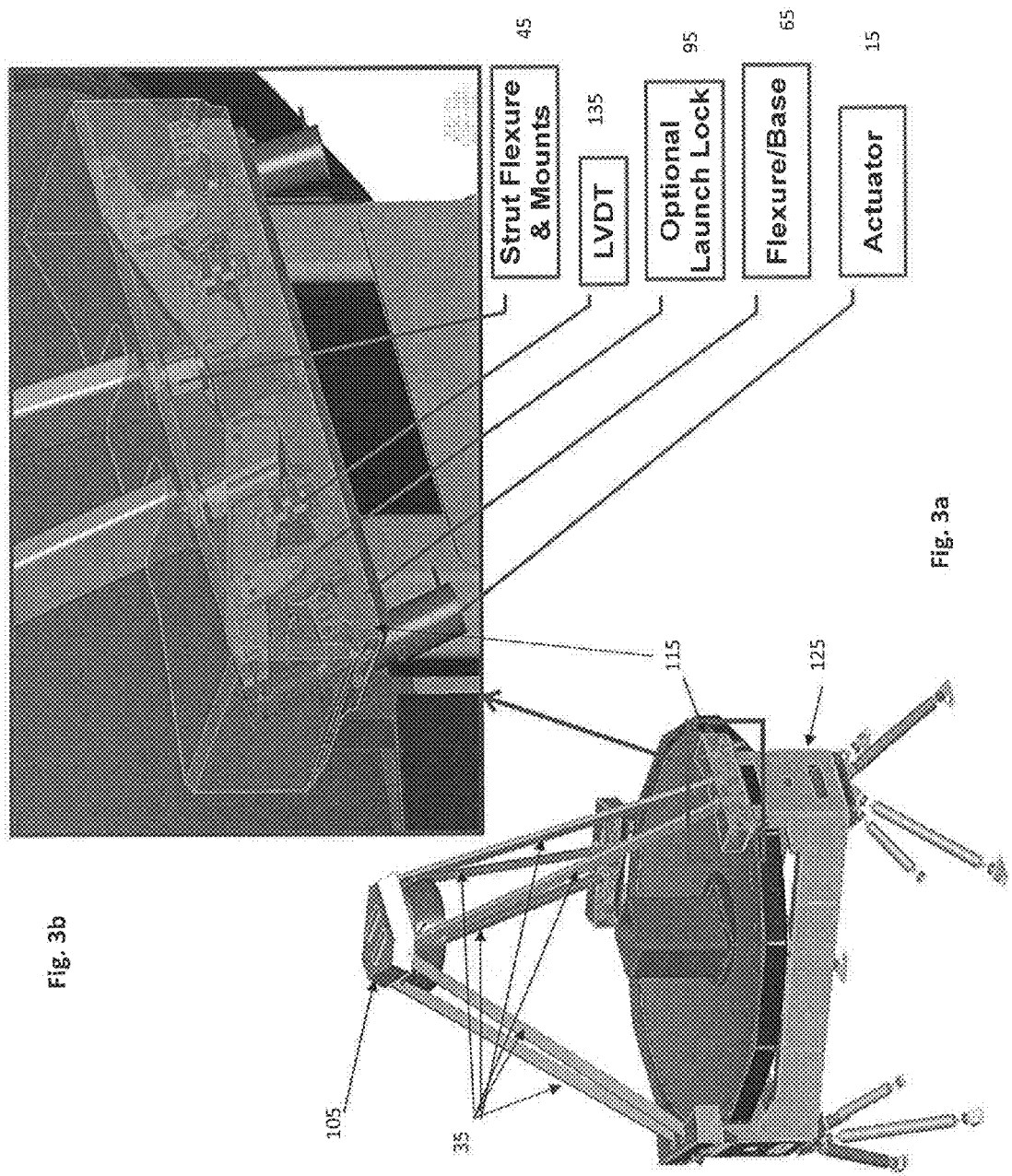

FIGS. 3a and 3b show one embodiment of the apparatus of these teachings for remotely positioning a component, where the component is a secondary mirror. In the embodiment shown in FIGS. 3a and 3b, the number of struts 35 is six (6) and 6 degrees of freedom can be adjusted in positioning the component. Each strut 35 is operatively attached to a strut mounting component 45 are one end and operatively connected to a mount for the component 105 at the other end. Each strut mounting component 45 is operatively connected to a motion adjustment apparatus 115. In one embodiment the motion adjustment apparatus 115 is apparatus shown in FIG. 1. In one instance, the motion adjustment apparatus 115 includes a position sensor, an LVDT in the embodiment shown in FIG. 3b. In the embodiment shown in FIG. 3b, the LVDT axis is parallel to the strut 35. As shown in FIG. 1, the motion adjustment apparatus 115 includes a linear motion actuator 15, located substantially parallel to the strut 35, a lever arm component 25 connected to a moving portion of the linear actuator 15 and to the strut mounting component 45, a principal flexure 55 attached to the lever arm component 25 at one edge closest to the strut 35, where the principal flexure 55 extends from the edge of the lever arm component 25 closest to the strut 35 to a base component 65 and the principal flexure 55 is parallel to the strut 35. The pivot point of the lever arm component 25 is located substantially at a mid point of the principal flexure 55. The base component 65 is also operatively attached to a nonmoving portion of the linear motion actuator 15. The base component 65 of each motion adjustment apparatus 115 is operatively attached to a rigid component 125. In one instance, the strut mounting component 45 is a shown in FIG. 2 and includes a strut mount 75 and a U joint flexure 85. Embodiments such as disclosed herein above for the motion adjustment apparatus 115 can be used with the embodiment of the apparatus for remotely positioning the component (secondary mirror) as shown in FIGS. 3a and 3b.

In some embodiments, the apparatus of these teachings for remotely positioning a component is used in positioning a component of a system that is placed in orbit. In those embodiments, the apparatus can include an optional launch lock 95. For a variety of practical designs, based on the primary flexure 55 being configured to be the principal strut load path during launch, the primary flexure 55 can take a majority of launch loads and the optional launch lock 95 is not required.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the invention has been described with respect to various embodiments, it should be realized these teachings are also capable of a wide variety of further and other embodiments within the spirit and scope of the appended claims.

The invention claimed is:

1. An apparatus for adjusting motion of a strut, the strut being a component in a positioning mechanism, the apparatus comprising:
    a linear motion actuator located substantially parallel to the strut; the strut not being constrained to one dimensional motion; an axis of the linear motion actuator being a distance away and different from an axis of the strut; the linear motion actuator moving along the axis of the linear motion actuator;
    a lever arm component operatively attached at one end to a moving portion of the linear motion actuator and operatively attached to a strut mounting component at a location between the one end and another end; and
    a flexure operatively attached to the lever arm component at an edge of the lever arm component closest to the strut; the flexure being parallel to the strut and extending from the edge of the lever arm component closest to the strut to a base component; the base component located away from another edge of the lever arm component; the base component being operatively attached to a nonmoving portion of the linear motion actuator and extending from the nonmoving portion of the linear motion actuator to at least a location at which the flexure is attached; a pivot point of the lever arm component being located at a position along the flexure; the flexure being located in a main load path of the strut; a center line of the flexure being a distance away and different from the axis of the strut and from the axis of the linear motion actuator.

2. The apparatus of claim 1 wherein the pivot point is located at a midpoint of the flexure.

3. The apparatus of claim 1 wherein the strut mounting component comprises a strut mount operatively connected to a U joint flexure; the U joint flexure comprising a 2-Axis flexure.

4. The apparatus of claim 1 wherein the flexure, the lever arm component and the base component are fabricated from a same material; thereby minimizing thermal expansion mismatch.

5. The apparatus of claim 4 wherein the same material comprises titanium.

6. The apparatus of claim 1 further comprising a position sensor configured to sense displacement of the strut.

7. The apparatus of claim 6 wherein the position sensor comprises a Linear Variable Differential Transformer (LVDT).

8. An apparatus for remotely positioning a component, the apparatus comprising:
- a plurality of struts configured to hold a mount for the component; each strut from the plurality of struts being operatively attached to a strut mount at a strut end opposite another strut end operatively connected to the mount for the component; each strut mount operatively attached to a motion adjustment apparatus; the motion adjustment apparatus comprising:
- a linear motion actuator located substantially parallel to the strut; the strut not being constrained to one dimensional motion; an axis of the linear motion actuator being a distance away and different from an axis of the strut the linear motion actuator moving along the axis of the linear motion actuator;
  - a lever arm component operationally attached at one end to a moving portion of the linear motion actuator and operationally attached to said each strut mount at a location between the one end and another end; and
  - a flexure operatively attached to the lever arm component at an edge of the lever arm component closest to the strut; the flexure being parallel to the strut and extending from the edge of the lever arm component closest to the strut to a base component; the base component located away from another edge of the lever arm component; the base component being operatively attached to a nonmoving portion of the linear motion actuator and extending from the nonmoving portion of the linear motion actuator to at least a location at which the flexure is attached; a pivot point of the lever arm component being located at a position along the flexure; the flexure being located in a main load path of the strut; a center line of the flexure being a distance away and different from the axis of the strut and from the axis of the linear motion actuator;
- and a rigid component, the base component of each motion adjustment apparatus being operatively attached to the rigid component.

9. The apparatus of claim 8 wherein the plurality of struts comprises six struts; and wherein six degrees of freedom can be adjusted in positioning the component.

10. The apparatus of claim 8 wherein the pivot point is located at a midpoint of the flexure.

11. The apparatus of claim 8 wherein the strut mount comprises a strut mounting subcomponent operatively connected to a U joint flexure; the U joint flexure comprising a 2-Axis flexure.

12. The apparatus of claim 8 wherein the flexure, the lever arm component and the base component are fabricated from a same material; thereby minimizing thermal expansion mismatch.

13. The apparatus of claim 12 wherein the same material comprises titanium.

14. The apparatus of claim 8 further comprising a position sensor configured to sense displacement of the strut.

15. The apparatus of claim 14 wherein the position sensor comprises a Linear Variable Differential Transformer (LVDT).

16. The apparatus of claim 8 wherein the component is a secondary mirror.

17. The apparatus of claim 11 wherein the strut mount is fabricated from a material selected to substantially match thermal expansion of a strut material.

18. The apparatus of claim 17 wherein the strut mount is fabricated from Invar.

19. The apparatus of claim 3 wherein the strut mounting component is fabricated from a material selected to substantially match thermal expansion of a strut material.

20. The apparatus of claim 19 wherein the strut mounting component is fabricated from Invar.

21. The apparatus of claim 3 wherein the strut mounting component further comprises two threaded components disposed along an axis of the strut mounting component, the strut being mounted substantially along said axis; one threaded component being disposed on one end of the strut mounting component and another threaded component being disposed at an opposite end of the strut mounting component; the two threaded components being configured for positioning during ground-based setup and testing.

22. The apparatus of claim 11 wherein the strut mount further comprises two threaded components disposed along an axis of the strut mounting subcomponent, the strut being mounted substantially along said axis; one threaded component being disposed on one end of the strut mounting subcomponent and another threaded component being disposed at an opposite end of the strut mounting subcomponent; the two threaded components being configured for positioning the component during ground-based setup and testing.

* * * * *